United States Patent [19]
Broome et al.

[11] 4,126,387
[45] Nov. 21, 1978

[54] MICROFORM READER

[76] Inventors: Barry G. Broome, 23601 Golden Springs Dr., Diamond Bar, Calif. 91765; George D. Margolin, 174 West 76th St., New York, N.Y. 10023

[21] Appl. No.: 754,123

[22] Filed: Dec. 27, 1976

[51] Int. Cl.² ............................................. G03B 21/22
[52] U.S. Cl. ..................... 353/77; 350/122; 350/128; 350/188; 353/26 R
[58] Field of Search ............... 350/122, 128, 188, 241; 353/38, 74–78, 26 A, 26 R

[56] References Cited

U.S. PATENT DOCUMENTS

| | | | |
|---|---|---|---|
| 1,984,004 | 12/1934 | Wildhaber | 350/128 |
| 2,124,587 | 7/1938 | Morrissey | 350/188 |
| 2,130,562 | 9/1938 | Pratt | 353/26 |
| 2,227,071 | 12/1940 | Dilks | 353/77 |
| 2,326,042 | 8/1943 | Lessman | 353/78 |
| 3,409,351 | 11/1968 | Winnek | 353/38 |
| 3,658,415 | 4/1972 | Miles | 353/74 |
| 3,711,188 | 1/1973 | Zehnpfennig | 353/77 |
| 3,728,014 | 4/1973 | Rosenblum | 353/38 |
| 3,848,980 | 11/1974 | Plummer | 353/76 |

FOREIGN PATENT DOCUMENTS 318,301  7/1934  Italy .......................................... 350/188

Primary Examiner—Richard E. Aegerter
Assistant Examiner—John W. Shepperd
Attorney, Agent, or Firm—David S. Woronoff

[57] ABSTRACT

A pocket-sized microform reader is realized by employing a unique lenticular (screen) assembly and a projection lens assembly, the latter permitting a fold in the middle of an optical path allowing the size requirements of such a reader to be met. The cooperation between the lenticular screen and the projection lens assemblies permits sufficient brightness to be obtained and the lenticular screen assembly defines a non wasteful exit pupil of limited dimensions consistent with a pocket-sized reader.

6 Claims, 9 Drawing Figures

FILM TRANSPORT

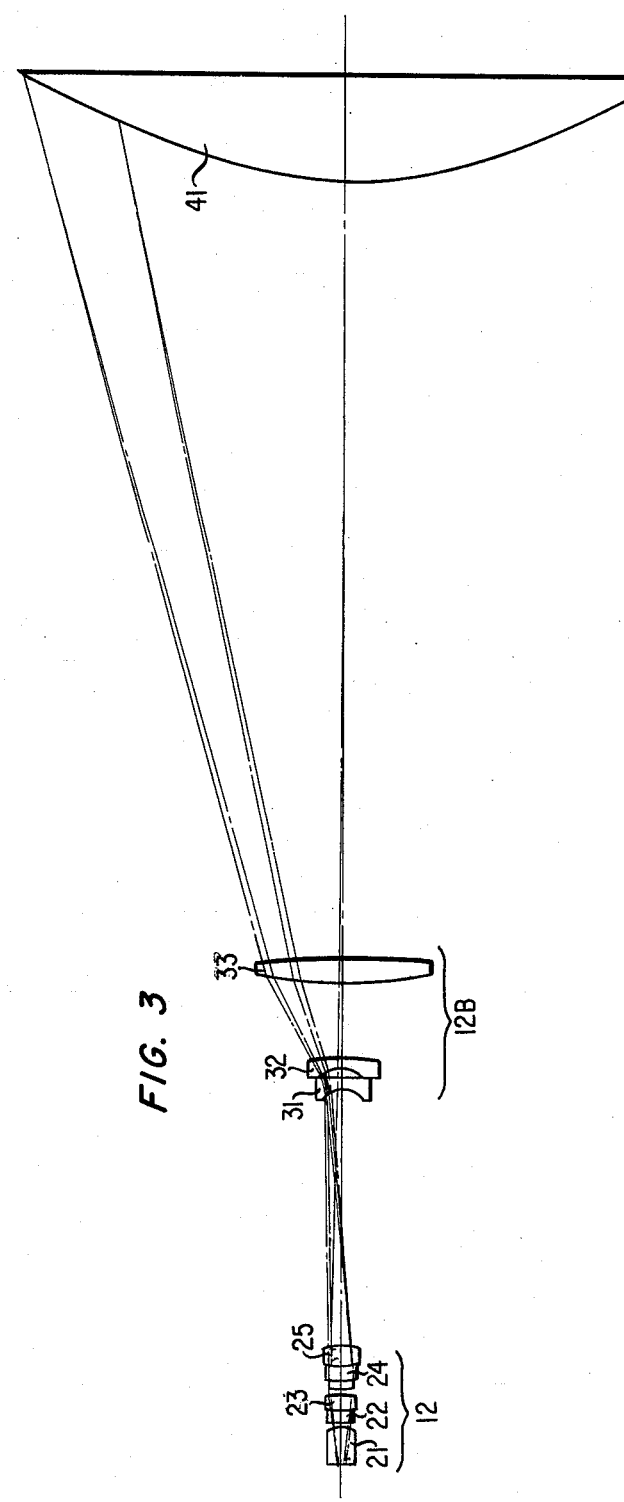
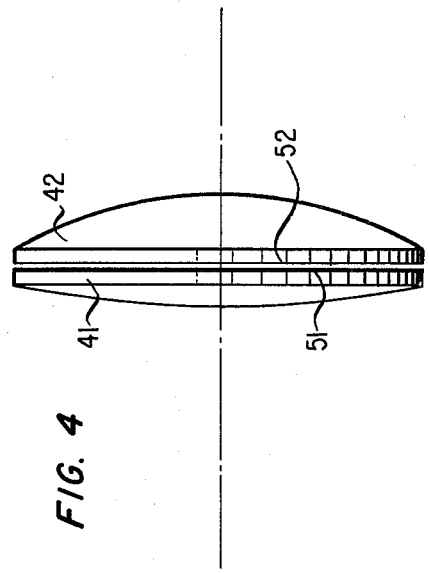

MICROFORM READER

FIELD OF THE INVENTION

This invention relates to microform viewers and more particularly to a viewer which is pocket sized.

BACKGROUND OF THE INVENTION

The many magnitudes of increased sales and use which materialized once the electronic calculator was reduced to pocket size may be taken as an indication that pocket-sized information devices, in general, will find wide acceptance in the market place. A pocket-sized microform viewer, for example, would seem to constitute a highly desirable candidate for success in this context. Yet such a small viewer appears to be beyond the state of the art at the present time.

One apparent reason for the inability to realize a pocket viewer at this time has to do with blow-back. The term "blow-back" refers to the image size produced by, for example, a viewer with respect to original copy. Thus, a typical page of print 8½ × 11 inches, when reduced to microfilm, would not be readable as an image projected on a pocket-sized viewer because such a viewer can have a viewing screen of only about 2½ inches to 3 inches and this would allow a blow-back of an image of about one quarter the size of the original. Thus, it is clear that a pocket-sized microfilm reader cannot be realized presently because the dictated maximum screen size is insufficient to allow a legible image to be produced from source materials of 8½ inches width or greater.

On the other hand, a non-real image device might be one possible route for realizing a viewer of such small dimensions. But further consideration indicates that this is not a possibility either. A virtual image device permitting viewing of the source material above is limited by the La Grange invariant. The term "La Grange invariant" characterizes the fact that all objects and images in a common optical system obey the relationship $nh \sin u = n'h' \sin u'$ where $n$ and $n'$ are indices of refraction for the object and image space, $\sin u$ and $\sin u'$ are the angles of the marginal ray from an axial point in the object and image space, and $h$ and $h'$ are the heights of the object and image, respectively. In the simplest terms, the relationship means that for a 100x pocket viewer requiring an exit pupil of about a five inch diameter located at about 10 inches from a field lens (a relative aperture of $f/2.0$) would require an impossibly fast $f/0.02$ projection lens.

The non applicability of a virtual image approach in realizing a microfilm viewer may be appreciated when it is remembered that a microscope is a virtual image viewer. Such a viewer has so small an exit pupil, that for magnifications higher than about 12x it becomes strictly a one-eye viewing device with a rigidly fixed or optically defined eye position. Such a device is unacceptable to most users of microfilm. From a consideration of alternative optical system approaches it would appear that a pocket sized microfilm viewer is out of the question.

When the power supply for such a device is considered, the realization of the device seems even less likely. The term "pocket-sized" implies a self-contained power source. Real image devices with either front or rear projection screens, particularly the latter, are so inefficient that a battery-powered device of proper size would have a battery life of only a few minutes. Yet the necessity for a power cord is to be avoided. With a cord and with a standard screen with sufficient magnification (about 50x or greater) to use a sufficiently small microform to provide a useful storage capacity in a pocket device (100 pages or more), the film would be subjected to temperatures higher than the 129° F. limit set by the National Micrographics Association because there is no room for a cooling fan. Thus, even from a power supply standpoint a pocket-size viewer is impractical.

BRIEF DESCRIPTION OF THE INVENTION

When one considers an optimum format to provide reading confort, it is realized that 11 to 12 point type in a column width of 14 to 19 picas is optimum in a field where at least five lines in a sequence can be read at a time. These considerations lead to a screen size of about 35 × 60 to 75 millimeters at which a real image 14 to 18 picas wide with eight lines in sequence can be produced. This approach to the determination of screen size, including a columnar form for the source material, is considered a novel departure from prior art approaches to microfilm viewers.

The realization of such a viewer depends on an optical system having a number of novel aspects. The viewer employs functional units common to larger microform viewers such as a film record holder, a lamp, a viewing screen, a projection lens assembly and a condenser lens assembly. But the lens assemblies and the viewing screen as well as the cooperation therebetween are significantly different from prior art functional units.

The projection lens assembly is divided into two groups which allow the folding of the optical path. The first group of lenses is operative to enlarge the film record in a manner such that the fan of rays from any selected object point fills the full aperture of the elements of the first group and only a small portion of the elements of the second group.

A number of advantages result. The physical separation of the optical elements of the projection lens assembly permits the folding of the optical path without having the second group sensitive to decentration error. The first group corrects for axial chromatic, spherical aberration and comma while the second group corrects for lateral chromatic, astigmatism, field curvature and distortion.

Only the first group requires high quality glass and/or particularly high precision in manufacture because only it "sees" the fan of rays from any point on the film record over its full aperture. By the time the pencil of rays from any point reaches the second set of elements, it is so small that it passes through only a small segment of this second lens array. This means that any imperfections in the injection molded elements of this group affects only a correspondingly small portion of the viewing screen. All told, this makes for dramatic easing of precision requirements of the lens manufacture and a remarkable lowering of manufacturing cost of a high magnification, high quality hybrid glass and plastic or all plastic optical system. And low cost, ease of manufacturing and high quality are uniquely required for such a universally desirable, consumer oriented device.

A novel lenticular array (screen) design results in a relatively high brightness gain. The high gain is obtained by using a refracting mechanism to diverge the energy into a small well-controlled exit pupil area. The refractive mechanism is achieved with a lenticular array of crossed-cylinder geometry. The cylindrical surfaces have both positive and negative curves (a periodic alternating structure free of discontinuities) to force the deviation from a plan surface to the largest possible dimension and a facet size of about one half of that resolvable by the eye at the comtemplated distance.

Two field lenses cooperate with the lenticular array to form a biocular screen assembly. The first lens serves the purpose of bending the chief ray for each image point into a path parallel with the optical axis of the system in order to insure that the crossed cylinders do not operate on skew rays. The second lens directs the chief rays to the center of the system exit pupil.

BRIEF DESCRIPTION OF THE DRAWING

FIG. 3 is a schematic illustration of the organization of optical elements of the reader of FIG. 1 showing the light paths defined thereby.

FIGS. 4, 5 and 6 are schematic illustrations of the biocular screen assembly of the viewer of FIG. 1.

GLOSSARY

A glossary of the various terms employed hereinafter is included as a ready reference in an understanding of the present invention:

Axial Chromatic — the horizontal distance between the images formed by a lens transmitting light of varying wavelength.

Spherical Aberration — when parallel rays entering a lens are focused at different points along the optical axis depending on the distance from the optical axis at which the rays entered the lens.

Coma — difference in magnification of rays traversing a lens at different distances from the optic axis.

Lateral Chromatic — the vertical distance between the images formed by a lens transmitting light of varying wavelengths.

Astigmatism — Orthogonally displaced fans of rays directed through a lens focusing on different image surfaces.

Field Curvature — The image surface is not a plane.

Decentration Error — Image structure aberrations induced by lens surfaces not being coaxial or tilted to a common axis.

DETAILED DESCRIPTION

Figure 1:
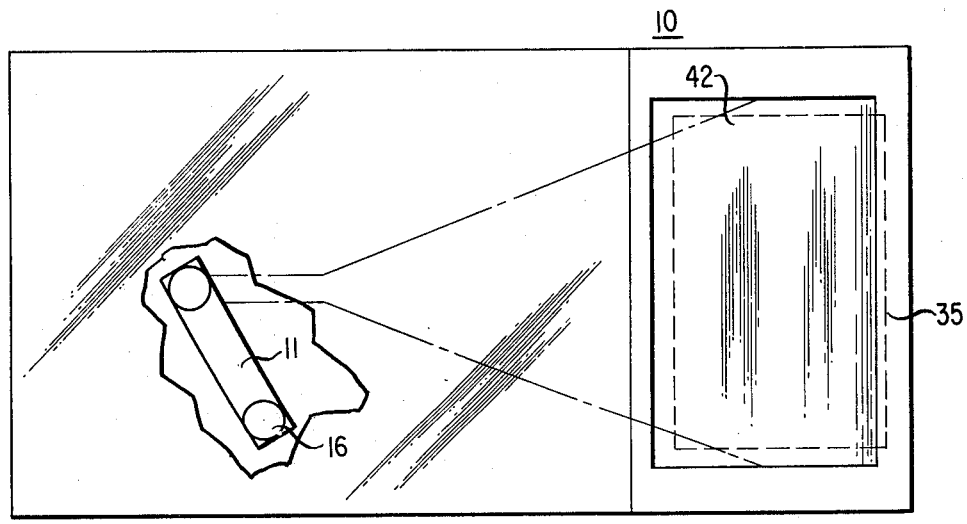
FIGS. 1 and 2 are schematic illustrations of top and side views of a microfilm reader in accordance with this invention.
Figure 2:
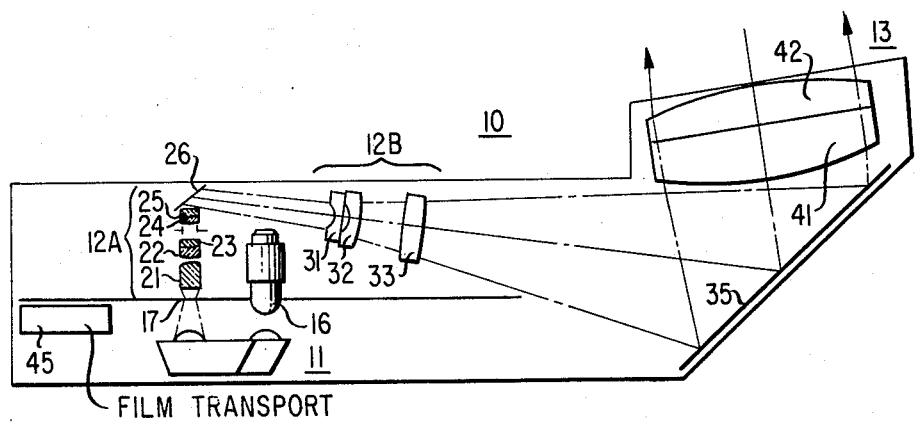

FIGS. 1 and 2 show, diagrammatically and in cross section, a pocket microfilm viewer 10 in accordance with this invention. The viewer includes a condenser lens assembly 11, a projection lens assembly 12A and 12B, and a biocular screen assembly 13. Light from a lamp 16 passes through the condenser assembly 11 and is directed at a film (record) at 17. The optical path traverses five elements 21, 22, 23, 24, and 25 of a first portion or group 12A of the projection lens assembly changing its path at mirror 26 and traversing three elements 31, 32, and 33 of a second portion or group 12B of the projection lens assembly.

The rays emerging from element 33 are directed at a mirror 35 which redirects the rays to the biocular screen arrangement. The biocular screen arrangement includes a field lens 41 and an eye lens 42.

A film transport arrangement is represented by block 45 in FIG. 2 and may comprise any suitable such arrangement such as a familiar movie film sprocket advance.

The invention is directed at a pocket microfilm viewer. Such a pocket-sized device typically has the dimensions of about three by seven by one and one half inches. Anything larger than this is considered in a class larger than pocket size, typically, desk top size. Moreover, the device is no more than about 1.5 inch high. Within the constraints imposed by these dimensions, the illustrative embodiment of this invention utilizes a projection lens consisting of five glass elements in a group near the film record and three plastic elements distant from the first group after a fold in the optical centerline. The novelty of this form is that the correction of the axial chromatic, spherical aberration, and coma is achieved by the five elements of the first group and correction of lateral chromatic, astigmatation, field curvature, and distortion is achieved by the second group of elements. The physical separation of corrective roles enables the optical path to be folded without having the second group of elements sensitive to decentration error.

The projection lens gemometry causes a fan of rays from any chosen point to fill the full aperture of the five elements in the first group but only a very small portion of the aperture of the elements in the second group. This condition permits the elements of the second group to be injection molded with no impact on system performance. The five elements in the first group are designed of optical glasses, which force the radii of curvature into flat curves, and are cheaply produced.

The field lens functions in concert with the lenticular lens array in the biocular screen to control the exit pupil properties of the system and has an effect on the field curvature, astigmatism, distortion, and lateral chromatic aberration balance of the projection lens. The field lens is optimized with the projection lens design. The field lens serves the purpose of bending the chief ray for each image point until it is parallel with the optical axis of the system. The parallel path of the chief ray combined with the fact that the convergent cone of rays with an inherent $f/200$ relative aperature appears to be collimated insures that a crossed cylinder biocular screen does not operate on skew rays. The field lens has one aspheric surface to provide control of the chief ray angle over the full field.

The biocular screen consists of two arrays of crossed cylindrical lenses. One array is molded onto the plane surface of the field lens and the other array is molded onto the plane surface of the eye lens. The cylinders are placed vertex to vertex and operate essentially to leverage the $f/200$ cone onto an $f/2$ cone. The $f/2$ cone produces the biocular exit pupil which has been chosen to be 8 inches wide at a 16 inch distance from the biocular screen. Since each point in the field diverges about a chief ray that is parallel to the optical axis of the system, an eye lens is employed to bend the chief rays down to a common focus at the pupil location.

A 100x biocular microfilm reader using such a novel screen obtains a screen brightness gain of approximately 15. The high gain value is obtained by using a refracting mechanism to direct the energy into a small controlled exit pupil area instead of scattering the energy over a large, poorly controlled exit pupil area. This is considered a particularly novel approach to a viewer system and is possible by virtue of the crossed cylinder array geometry. The cylinders have both positive and negative curves to force the deviation from a plane surface to the largest possible dimensions; the cylinder width is chosen to be only 0.005 inch which is approximately half that which the eye can resolve at 16 inches to insure ideal resolution. The cylindrical surfaces of the lenses deviate only 0.0013 inch from a plane surface. The use of a screen of this type allows the reduced size required of pocket devices to be realized. Thus, a pocket microform viewer including a lenticular lens (screen) having a crossed cylinder array as described, is considered a particularly novel feature of this invention, the lens allowing the size reduction required for pocket viewers and avoiding the La Grangian invariant. A viewer of this type can be observed clearly from any point in the exit pupil area with a brightness exceeding 40 foot lamberts. Distortion is imperceptible (less than 0.5%) and resolution exceeds 5LP/mm at the screen.

Since it is important that the crossed cylinders of the lenticular screen are not separated by opaque interfaces (dark lines), as this would reduce overall light intensity and would intensify the incidence of objectionable moire by providing a periodic pattern of high contrast, the screen utilizes a crossed positive and negative configuration.

FIG. 3 shows the two groups of lenses 12A and 12B and the effect thereof on light rays originating at the film record from the left as viewed. The rays are represented as originating from a representative point on the film record to occupy the full aperture of lens 25 of group 12A. The lenses of group 12B are placed at a sufficient distance from the lenses of group 12A so that rays from the representative point on the film record pass through a small portion of the aperture of lens 31, (typically less than 1mm of the aperture). Similarly, rays eminating from each point of the film record occupy the entire aperture of lens 25 and pass through different portions of the aperture of lens 31. The individual fans of rays passing through lens 31 are diverged by lenses 32 and 33 and projected at field lens 41 for divergence into the exit pupil. It can be appreciated that the lenticular array thus has incident upon it a highly magnified image and has a feature size chosen in such a way that if the lens system has a magnification M (with a given throw) and a resolving power R for producing an image with a width R/M resolved by the human eye at 16 inches, that feature size is R/2M. Thus, the screen has two picture elements (Pixels) in each dimension for each resolution element.

A film record suitable for such a system has a maximum width of about 20 pica/M. These relationships are considered significantly different from those dictated by prior considerations because, for example, according to the prior art, any lenticular array would have a feature size of R/M. Further, the lenticular array for this system has a width or height of from 35 millimeters to a maximum width of about 85 millimeters. Prior art lenticular screens are large compared to these dimensions, being useful, for example, as outdoor movie screens. The use of an array of such small dimension is indicative of a novel cooperation thereof with the remaining elements of the viewer herein to achieve brightness in a confined area suitable primarily for viewing by a single individual.

Figure 5:
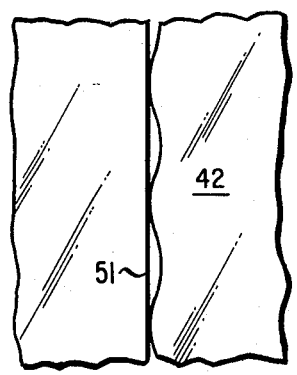
Figure 6:
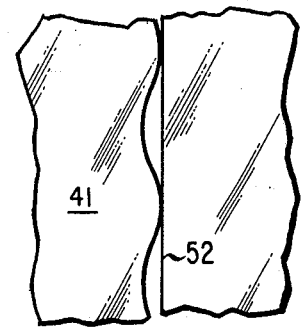

FIGS. 4, 5 and 6 show the detail of the biocular screen. FIG. 4 shows field lens 41 and eye lens 42 in juxtaposition with surfaces 51 and 52 abutting. In the illustrative embodiment, surface 51 and 52 are molded to define crossed cylinder arrays of the lenticular "screen." FIGS. 5 and 6 show the detail of that array. FIG. 5, for example, shows the detail of the face of eye lens 42 adjacent a cylinder edge of surface 51. A 0.005 inch cylinder pitch is employed along with an overall sag of 0.0013 inch. FIG. 6 similarly shows the molded shape of the surface of field lens 41 adjacent a cylinder edge of surface 52.

Figure 7B:
FIGS. 7A, 7B and 7C are schematic side, top and edge views of the condensing lens assembly of the viewer of FIG. 1.
Figure 7A:
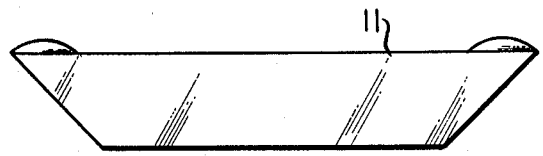
Figure 7C:

FIGS. 7A, 7B and 7C show the condenser lens assembly in side, top and edge views respectively. The truncated geometry of the lens with aspheric surfaces as shown enables substantial flexibility in lamp placement, as shown in FIG. 2.

A complete computer printout listing of the specifications of the various lens elements of an illustrative system in accordance with this invention is as follows:

| 100X Retrofocus Lens | | | | | | |
|---|---|---|---|---|---|---|
| Element | R1 | R2 | T | CA1 | CA2 | Glass |
| 41 | INF | A(1) | 10.5000 | 71.4000 | 71.3982 | 492.578 |
| | | | 93.6982 | | | |
| 33 | 82.6916 | −38.5956 | 2.9858 | 18.0389 | 17.3922 | 591.308 |
| | | | 7.7483 | | | |
| 32 | 12.8025 | 3.8235 | 1.5000 | 6.8846 | 5.0420 | 492.578 |
| | | | .9261 | | | |
| 31 | 138.8686 | 4.3266 | 1.5000 | 5.0420 | 4.2286 | 492.578 |
| | | | 27.1417 | | | |
| 25 | 12.1934 | −6.0455 | 2.0841 | 2.9653 | 2.8093 | FK5 |
| 24 | −6.0455 | −11.3290 | 1.5000 | 2.8093 | 2.7947 | LAFN3 |
| | | | 1.0748 | | | |
| | | Aperature Stop | | 2.3785 | | |
| | | | .5000 | | | |
| 23 | 6.9698 | −5.9815 | 1.5000 | 2.5055 | 2.3623 | FK5 |
| 22 | −5.9815 | −38.7259 | 1.5000 | 2.3623 | 2.3216 | SF11 |
| | | | .5000 | | | |
| 21 | 4.3593 | INF | 3.8411 | 2.2597 | 1.2298 | LAKN16 |
| | | | 1.5004 | | | |
| | DEFOCUSSING | + | −.0004 | | | |
| Image | INFINITY | | | .7140 | | |

Note: POSITIVE RADIUS INDICATES THE CENTER OF CURVATURE IS TO THE RIGHT
NEGATIVE RADIUS INDICATES THE CENTER OF CURVATURE IS TO THE LEFT

ASPHERIC CONSTANTS $$Z = \frac{(\text{Curv})Y^2}{1 + (1 - (1+K)(\text{CURV})^2 Y^2)^{\frac{1}{2}}} + (A) Y^4 + (B) Y^6 + (C) Y^8 + (D) Y^{10}$$

| ASPHERIC | CURV | K | A | B | C | D |
|---|---|---|---|---|---|---|

Printout Detailed Explanation

The foregoing printout works from top to bottom from the output lens 41 to the film record and left to right (Columns A through F) as is customary in the lens design art.

In FIG. 4, 42 is the eye lens operative to converge the relatively parallel rays from Field Lens 41 to the desired 8 inches × 8 inches Pupil 16 inches from the viewer.

Column A (R1) shows Radii of the first Surfaces of the lenses numbered as shown where the "first Surface" is the surface towards the eye lens.

Column B (R2) shows Radii of the Second Surfaces. (Note [1] - Positive

Radius indicates that the center of curvature is the right.

Negative radius indicates the center of curvature is to the left. Note [2] — measurements are given in millimeters)

Column C (T) shows thickness of an element at axis or distance from center of element to first surface of next lens or film record.

Column D (CA1) shows diameter of entrance pupil at the first surface.

Column E (CA2) shows diameter of exit pupil at the second surface.

Column F (Glass) indicates glass or plastic material being used.

In the use of plastics they are designated by their index of refraction (less 1). So we have two types of plastic — acrylic and polystyrene (1.) 492.578 and (1.) 591.308.

Designations such as FK 5, LA FN 3, SF 11 and LA KN 16 are specific optical glasses available to all optical designers and these designations are commonly used in the art.

Thus, for element 41, the printout shows that the first surface is flat (infinite center of curvature, the second surface is an aspheric one whose formula is shown under "Aspheric (constants" at the bottom of the printout, its thickness is 10.5 mm and its second surface is 83.6982 mm from the next lens. The printout also shows that the Entrance Pupil for this lens is 71.4 mm in diameter, its Exit pupil is 71.3982 mm in diameter, and it is made of plastic with an index of refraction of (1.) 492.578.

It follows then that each element is so described with the aperture stop between elements 24 and 23 having a diameter of 2.3785 mm. The focused image (or in reality film record being projected) has a diameter of 0.7140 mm (this being just over the diagonal of 0.69462219 mm of the 0.6 mm × 0.35 mm format chosen for the initial 100 X embodiment of this invention.

The recognition that a columnar form of print for the film record is useful for such a pocket reader provides a base for establishing a consistent set of criteria for the various elements herein as was indicated herein before. It should be appreciated that the requirements of a pocket size viewer which can be manipulated by hand are considerably different from those of all prior art viewers. Consider for example, the requirements of a viewer which is fixed in space. The observers must position himself for viewing and the viewer must be designed to provide sufficient image brightness over a significantly large viewing area. Not so with a hand viewer. In this case the user re-orients the viewer to his own needs. The viewer need provide image brightness over an area only slightly larger than the interocular space of the observer. The use of the columnar form for the film record permits the realization of a suitable system for a hand-held viewer with sufficiently large image size.

Considerable modification of the individual lens elements over conventional elements of larger prior art viewers was necessary to realize a pocketsized viewer. For example, each lens in group 12A is very thick (along the optical path) relative to its diameter and has a very flat curve.

If normal lens technology were used for the lenses in the illustrative embodiment — the short overall focal length (1.2mm) would have resulted in such small and paper thin lenses that fabrication and assembly would not be possible at the costs and in the quantities anticipated by this compact information device. Or — if current microscope manufacturing and design concepts were followed — the highly curved surfaces would be too costly to fabricate, and the completed lens would not have the wide angular field required. In addition, by trading off thickness for much flatter curves, large numbers of these lenses may be generated and polished on one machine at one time.

It is helpful to orient the lenticular screen at a 45° angle with the x and y axes of the normal features on the screen. The reason for this is that the normal eye is often slightly astigmatic and is particularly sensitive to horizontal and vertical lines which characterize a normally oriented lenticular screen. So even if the lens feature size is below the limit of eye resolution, this reinforcement of the vertical and horizontal lines creates a disturbing effect. By orientation of the screen at some other angle, say 35° to 50° as one would in half tone printing, one takes advantage of the most common eye defect, to render a periodic array less visible. In addition, the tilt of the array will not coincide with and will not reinforce the vertical and horizontal lines of type, horizon lines or any other such line found in source material.

The sag required by the lenticular lens described hereinbefore is realized only with very high precision processing and considerable stability in base material. For example, often the shrinkage in plastic is greater than the required of ±0.00065 inch above and below the average base surface sag. In order to avoid such stringent requirements, two lenticular arrays with more realizable sag can be placed in juxtaposition and the space therebetween filled with transparent material having an index of refraction greater than air and less than the material of the lenticular array. When properly adjusted, in accordance with well understood principles, such an arrangement will produce a more easily realized lenticular screen array.

It is also helpful to note that the film record can be arranged on a transparent disc laid out in a continuous strip along an Archimedes spiral for rotation about a spindle as in the case with a phonograph record. The spindle in this case is translatable in order to keep the advancing record in registry with the viewing lens.

What has been described is considered merely illustrative of the principles of this invention. Accordingly, various modifications can be derived by those skilled in the art, in accordance with those principles, within the spirit and scope of the following claims.

What is claimed is:

1. Optical system comprising a lens having a resolution R and a magnification M, said lens defining a resolution in a viewing plane of R/M, and a lenticular screen in said viewing plane, said screen having an array of features formed from a plurality of crossed elements having a sinusoidal-like surface has each crossed element has a dimension less than or equal to ½ R/M.

2. A microform reader including a film record holder for holding a film record and a screen assembly, said microform reader having an optical system for defining an optical path between said film record and said screen assembly between said screen assembly including a lenticular array having a width of up to about 85 millimeters, said optical system having a magnification M, said film record having a width of less than 20 M pica, said screen assembly comprises first and second cylindrical arrays disposed perpendicular to one another, each of said arrays comprising cylinders of alternating positive and negative radia, each of said radia substantially equal in length forming an array having a sinusoidal-like shape, said radia having a curvature with a peak to peak measurement of up to about 0.0013 inches.

3. A microform reader in accordance with claim 2 wherein said first and second cylindrical arrays are molded into juxtaposed field and eye lenses respectively.

4. A microform reader in accordance with claim 1 wherein said screen has a base and $x$ and $y$ sets of relatively perpendicular features, said screen assembly being oriented at an angle with respect to said base.

5. A microform reader in accordance with claim 1 wherein said film record is in the form of a transparent disc containing columnar information arrayed continuously in an archimedian spiral.

6. A microform having defined thereon a film record with a width of less than 20 pica/M for use in a microform reader in accordance with claim 1.

* * * * *